United States Patent
Oh et al.

(10) Patent No.: US 10,938,050 B2
(45) Date of Patent: Mar. 2, 2021

(54) MEMBRANE ELECTRODE ASSEMBLY FOR FUEL CELLS AND MANUFACTURING METHOD THEREOF

(71) Applicants: HYUNDAI MOTOR COMPANY, Seoul (KR); KIA MOTORS CORPORATION, Seoul (KR)

(72) Inventors: Jong Kil Oh, Yongin-si (KR); Bo Ki Hong, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 396 days.

(21) Appl. No.: 15/818,662

(22) Filed: Nov. 20, 2017

(65) Prior Publication Data

US 2018/0166721 A1 Jun. 14, 2018

(30) Foreign Application Priority Data

Dec. 13, 2016 (KR) .................. 10-2016-0169485

(51) Int. Cl.
| | |
|---|---|
| *H01M 8/1004* | (2016.01) |
| *H01M 8/0271* | (2016.01) |
| *H01M 8/0273* | (2016.01) |
| *H01M 8/1016* | (2016.01) |
| *H01M 8/04119* | (2016.01) |
| *H01M 8/1088* | (2016.01) |

(Continued)

(52) U.S. Cl.
CPC ....... *H01M 8/1004* (2013.01); *H01M 8/0271* (2013.01); *H01M 8/0273* (2013.01); *H01M 8/04119* (2013.01); *H01M 8/1016* (2013.01); *H01M 8/1041* (2013.01); *H01M 8/1065* (2013.01); *H01M 8/1088* (2013.01); *Y02P 70/50* (2015.11)

(58) Field of Classification Search
CPC ............................. H01M 8/027; H01M 8/00
See application file for complete search history.

(56) References Cited

U.S. PATENT DOCUMENTS

| | | | | |
|---|---|---|---|---|
| 2010/0043954 | A1* | 2/2010 | Shimoda | H01M 4/8605 156/182 |
| 2017/0346124 | A1* | 11/2017 | Lee | H01M 8/188 |

FOREIGN PATENT DOCUMENTS

JP 2009-301755 A 12/2009

OTHER PUBLICATIONS

K. Hongsirikam et al., "Effect of cations (Na+, Ca2+, Fe3+) on the conductivity of a Nafion membranne," Journal of Power Sources 195 (2010) pp. 7213-7220.

(Continued)

*Primary Examiner* — James Lee
(74) *Attorney, Agent, or Firm* — Morgan, Lewis & Bockius LLP (57) ABSTRACT

A membrane electrode assembly includes: an electrolyte membrane; a cathode and an anode, each being stacked on the electrolyte membrane; and subgaskets bonded to a peripheral region of the electrolyte membrane, which is outside an active area, in which each of the cathode and the anode are stacked on the electrolyte membrane. The electrolyte membrane is disposed in at least a portion of the peripheral region of the electrolyte membrane, which is outside the active area, with a water discharge blocking region for preventing water in the electrolyte membrane from diffusing and being discharged to outside.

11 Claims, 3 Drawing Sheets

(51) Int. Cl.
  *H01M 8/1041*  (2016.01)
  *H01M 8/1065*  (2016.01)

(56) References Cited

OTHER PUBLICATIONS

M.J. Kelly et al., "Contaminant absorption and conductivity in polymer electrolyte membranes," Journal of Power Sources, 145 (2005), pp. 249-252.
D.A. Shores et al., "Basic material corrosion issues," Handbook of Fuel Cells—Fundamentals, Technology and Application, (2010) pp. 1-13.

* cited by examiner

MEMBRANE ELECTRODE ASSEMBLY FOR FUEL CELLS AND MANUFACTURING METHOD THEREOF

CROSS-REFERENCE TO RELATED APPLICATION

This application claims under 35 U.S.C. § 119(a) the benefit of priority to Korean Patent Application No. 10-2016-0169485 filed on Dec. 13, 2016, the entire content of which is incorporated herein by reference.

TECHNICAL FIELD

The present disclosure relates to a membrane electrode assembly for fuel cells and a manufacturing method thereof. More particularly, the present disclosure relates to a membrane electrode assembly for fuel cells capable of preventing water in an electrolyte membrane of the membrane electrode assembly from diffusing to a peripheral region of the electrolyte membrane, which is outside an active area of a fuel cell, thereby preventing loss of the water used for fuel cell reaction in the electrolyte membrane, to improve efficiency in handling of water in the fuel cell, and to improve corrosion resistance of a stack and a manufacturing method thereof.

BACKGROUND

A fuel cell is a power generation device that induces an electrochemical reaction between fuel gas and oxidizing gas to convert chemical energy in fuel into electrical energy. Such a fuel cell is widely used for a power source in industries, homes, and vehicles. The fuel cell may also be used to supply power to small-sized electric/electronic products or portable devices.

To date, a polymer electrolyte membrane fuel cell (PEMFC), which exhibits high power density, has been widely used as the fuel cell for vehicles. The polymer electrolyte membrane fuel cell is used as a power source for supplying power to a motor for driving a fuel cell vehicle and various kinds of electric devices of the fuel cell vehicle.

In the polymer electrolyte membrane fuel cell, hydrogen is used as fuel gas, and oxygen or air including oxygen is used as oxidizing gas.

In addition, the fuel cell includes a cell in which the fuel gas and the oxidizing gas react with each other to generate electrical energy. In general, a plurality of cells is stacked and connected to each other in series in the form of a stack to satisfy power requirements.

The fuel cell for vehicles requires high power. For this reason, several hundred unit cells, each of which generates electrical energy, are stacked in the form of a stack.

Each unit cell of the polymer electrolyte membrane fuel cell includes a membrane electrode assembly (MEA), which includes a polymer electrolyte membrane capable of moving protons and electrodes attached to opposite surfaces of the polymer electrolyte membrane, a gas diffusion layer (GDL) for supplying reaction gases, such as fuel gas and oxidizing gas, to the membrane electrode assembly and transmitting generated electrical energy, a gasket for maintaining airtightness of the reaction gases and coolant, a fastening member for maintaining appropriate fastening pressure, and a bipolar plate (BP) for moving the reaction gases and the coolant.

The membrane electrode assembly (MEA) includes a polymer electrolyte membrane capable of moving protons and an anode and a cathode attached to opposite surfaces of the polymer electrolyte membrane, a catalyst for inducing a reaction between hydrogen, which is fuel gas, and air (or oxygen), which is oxidizing gas, being applied to the anode and the cathode.

A gas diffusion layer (GDL) for uniformly distributing the fuel gas and the oxidizing gas is stacked on the outside of the membrane electrode assembly, i.e. the outside of each of the anode and the cathode, and a bipolar plate for providing a channel, along which reaction gases and coolant flow, and supplying the reaction gases to the gas diffusion layer is disposed at the outside of the gas diffusion layer.

In addition, a gasket for fluid sealing is disposed between parts constituting unit cells. The gasket may be integrally formed with the membrane electrode assembly or the bipolar plate.

The above elements constitute a unit cell. A plurality of cells is stacked, end plates for supporting the cells are coupled to the outermost ends of the stacked cells, and the end plates are fastened to the cells using a stack fastening member to constitute a fuel cell stack.

A reaction in the fuel cell for generating electrical energy is performed in a membrane electrode assembly (MEA) including a perfluorinated sulfonic acid (PFSA) electrolyte membrane and electrodes, such as an anode and a cathode.

At this time, fuel gas, i.e. hydrogen, supplied to the anode, which is an oxidation electrode (i.e. a fuel electrode) of the fuel cell, is separated into protons and electrons. The protons move to the cathode, which is a reduction electrode (i.e. an air electrode) through the electrolyte membrane. Oxygen molecules, protons, and electrons react together at the cathode, with the result that electricity and heat are generated. At the same time, water is generated as a reaction by-product.

In particular, when the protons move from the anode to the cathode through the membrane, the protons are coupled to water molecules in the form of hydronium ions, with the result that an electro-osmotic drag (EOD) phenomenon, in which the protons drag the water molecules, occurs.

In addition, if the amount of water accumulated in the cathode increases, a back diffusion phenomenon, in which some of the water moves backward from the cathode to the anode, may occur.

If the amount of water that is generated by the fuel cell reaction and is then moved is appropriate, it is possible to maintain the wettability of the membrane electrode assembly (MEA). However, if the amount of water is excessive, a water flooding phenomenon occurs. For this reason, it is necessary to appropriately remove the excessive amount of water.

In addition, the flooded water prevents reaction gases from being efficiently supplied into the unit cells of the fuel cell, whereby voltage loss is further increased.

In order to enable the fuel cell to stably operate within a wide current density range, and therefore, it is necessary to accurately understand such a water movement phenomenon and to efficiently use the water in the fuel cell.

In general, compression pressure, generated by the gasket, which is made of a rubber elastomer, is applied to the membrane electrode assembly for a long time. The shape of the membrane electrode assembly must be maintained without being torn or deformed even when the membrane electrode assembly is compressed for a long time.

In addition, high stiffness is required in order to improve a handling property during stacking of membrane electrode assemblies.

For this reason, a solid-phase, film-shaped subgasket exhibiting high stiffness is laminated to a peripheral region of the membrane by applying heat.

If the membrane electrode assembly includes such a subgasket, membrane electrode assemblies may be used for a long time even when several hundred membrane electrode assemblies are stacked in one stack.

In the structure of a conventional membrane electrode assembly, an electrolyte membrane is manufactured such that, in addition to an active area, in which a cathode and an anode, which are used to induce an electrochemical reaction in the fuel cell, are bonded to the electrolyte membrane, an extended region is formed outside the active area of the fuel cell in order to securely bond the subgasket to the electrolyte membrane. The subgasket is bonded to the extended region, i.e. a peripheral region, of the electrolyte membrane.

In the structure of the conventional membrane electrode assembly, however, water may diffuse to the peripheral region of the electrolyte membrane, to which the subgasket is bonded, which is not desirable. As a result, the water used for the fuel cell reaction may be lost.

In addition, the diffused water may corrode the other parts of the stack that are made of metal materials, whereby the stability in travel of the vehicle may be greatly lowered.

In order to solve the above problems, there has been proposed a method of reducing the size of the peripheral region of the electrolyte membrane, which is outside the active area of the membrane electrode assembly (MEA), i.e. the peripheral region of the electrolyte membrane, to which the subgasket is bonded, so as to be less than the size of the subgasket, thereby preventing the membrane of the membrane electrode assembly from being exposed to the outside and thus preventing water from being discharged to the outside.

However, the reaction gases and the coolant may leak due to the step between the region of the subgasket to which the electrolyte membrane is bonded and the region of the subgasket to which the electrolyte membrane is not bonded. Furthermore, the membrane and the subgasket may be separated from each other after operation of the fuel cell for a long time, with the result that the operation of the fuel cell may be stopped.

Alternatively, methods of bonding the subgasket to the membrane electrode assembly through injection molding rather than lamination have been proposed. When the subgasket is injection-molded using these methods, the membrane electrode assembly may be deformed or contaminated.

In addition, a complicated multistage process may be performed in order to solve the above problems. As a result, a subgasket bonding process is complicated, whereby productivity is reduced.

SUMMARY OF THE DISCLOSURE

The present disclosure has been made in an effort to solve the above-described problems associated with the related art. Thus the present disclosure is directed to providing a membrane electrode assembly for fuel cells configured such that it is possible to prevent water in an electrolyte membrane of the membrane electrode assembly from diffusing to a peripheral region of the electrolyte membrane, which is outside an active area of a fuel cell, thereby preventing the loss of the water used for fuel cell reaction in the electrolyte membrane, to improve efficiency in handling of water in the fuel cell, and to improve corrosion resistance of a stack and a manufacturing method thereof.

According to an exemplary embodiment of the present disclosure, a membrane electrode assembly for fuel cells includes: an electrolyte membrane; a cathode and an anode, each being stacked on the electrolyte membrane; and subgaskets bonded to a peripheral region of the electrolyte membrane, which is outside an active area, in which the cathode and the anode are stacked on the electrolyte membrane. The electrolyte membrane is provided in at least a portion of the peripheral region of the electrolyte membrane, which is outside the active area, with a water discharge blocking region for preventing water in the electrolyte membrane from diffusing and being discharged to the outside.

According to another exemplary embodiment of the present disclosure, a method of manufacturing a membrane electrode assembly for fuel cells includes: applying a metal cation solution, having a metal cation precursor dissolved in a solvent, to at least a selected portion of a peripheral region of an electrolyte membrane, which is outside an active area of the electrolyte membrane, in which a cathode and an anode are stacked on the electrolyte membrane, to form a water discharge blocking region; stacking the cathode and the anode on the active area of the electrolyte membrane; and stacking subgaskets on the peripheral region of the electrolyte membrane, which is outside the active area, in which the cathode and the anode are stacked on the electrolyte membrane. The water discharge blocking region is formed as a result of protons coupled in a sulfonic acid group ($-SO_3^-H^+$) of the electrolyte membrane being substituted by metal cations in the solution.

Other aspects and embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, the exemplary embodiment of the present disclosure will be described in detail with reference to the accompanying drawings to allow those skilled in the art to easily practice the present disclosure.

Advantages and features of the present disclosure and methods for achieving the same will be clearly understood with reference to the following detailed description of embodiments in conjunction with the accompanying drawings.

However, the present disclosure is not limited to the embodiments disclosed herein, but may be implemented in various different forms. The embodiments are merely given to make the disclosure of the present disclosure perfect and to perfectly instruct the scope of the disclosure to those skilled in the art, and the present disclosure should be defined by the scope of claims.

In addition, in the description of the present disclosure, a detailed description of related known technologies and the like will be omitted when it makes the subject of the present disclosure unclear.

The terms "comprises" and "comprising" described herein should be interpreted not to exclude other elements but to further include such other elements unless mentioned otherwise.

The present disclosure provides a membrane electrode assembly for fuel cells configured such that it is possible to prevent water in an electrolyte membrane of the membrane electrode assembly from diffusing to a peripheral region of the electrolyte membrane, which is outside an active area of a fuel cell without reduction of fuel cell operation performance and damage to airtightness, thereby preventing the loss of the water used for fuel cell reaction in the electrolyte membrane, to improve efficiency in handling of water in the fuel cell, and to improve corrosion resistance of a stack and a manufacturing method thereof.

Figure 1:
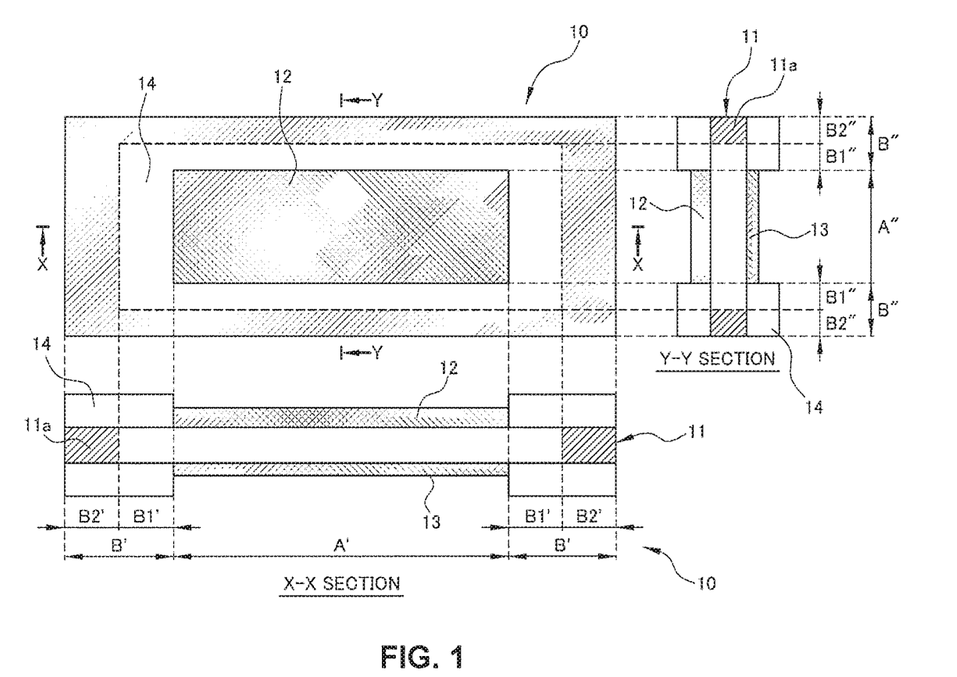
FIG. 1 shows a membrane electrode assembly according to an embodiment of the present disclosure.

FIG. 1 is a plan view and sectional views showing a membrane electrode assembly according to an embodiment of the present disclosure.

As shown in FIG. 1, a membrane electrode assembly (MEA) 10 according to the present disclosure, which is used in a polymer electrolyte membrane fuel cell (PEMFC), includes a polymer electrolyte membrane 11 capable of moving protons, an anode 13 and a cathode 12 attached to opposite surfaces of the polymer electrolyte membrane 11, a catalyst for inducing a reaction between hydrogen, which is fuel gas, and air (or oxygen), which is oxidizing gas, being applied to the anode 13 and the cathode 12, and subgaskets 14 bonded to opposite surfaces of a peripheral region of the polymer electrolyte membrane 11.

The membrane electrode assembly 10 has an area in which the anode 13 and the cathode 12 are bonded to the polymer electrolyte membrane 11, which is an area in which an electrochemical reaction occurs, i.e. an active area, to which the fuel gas and the oxidizing gas are supplied such that a reaction occurs in a fuel cell.

That is, the cathode 12 and the anode 13 are attached to opposite surfaces of the membrane electrode assembly 10, and the area in which the cathode 12 and the anode 13 are bonded to the polymer electrolyte membrane 11 is an active area, in which reaction occurs in the fuel cell.

In addition, the subgaskets 14 are bonded to the peripheral region of the polymer electrolyte membrane 11 excluding the active area, in which the cathode 12 and the anode 13 are bonded to the polymer electrolyte membrane 11. The subgaskets 14 may be bonded to the entire peripheral region of the polymer electrolyte membrane 11 excluding the active area.

FIG. 1 is a plan view of the membrane electrode assembly. In addition, FIG. 1 is a sectional view taken along line X-X of the plan view and a sectional view taken along line Y-Y of the plan view. Here, line X-X may be a line extending in a longitudinal direction of the membrane electrode assembly 10 while passing through the active area, and line Y-Y may a line extending in the lateral direction of the membrane electrode assembly 10 while passing through the active area.

Referring to FIG. 1, the active area of the membrane electrode assembly 10, in which the cathode 12 and the anode 13 are bonded to the polymer electrolyte membrane 11, is located in the middle of the membrane electrode assembly in a rectangular shape.

In addition, the subgaskets 14 are bonded to the peripheral region of the polymer electrolyte membrane 11 excluding the middle active area, in which the cathode 12 and the anode 13 are bonded to the polymer electrolyte membrane 11. Each subgasket 14 has a rectangular opening formed in the middle thereof such that the middle active area is exposed through the opening, i.e. such that the cathode 12 and the anode 13 are exposed, through the opening.

More specifically, each subgasket 14 is formed in a rectangular frame shape such that each subgasket 14 is located at the rectangular edge of the membrane electrode assembly 10. At this time, the subgaskets 14 may be stacked and bonded to the opposite surfaces of the polymer electrolyte membrane 11 at the peripheral region of the polymer electrolyte membrane 11, which is outside the cathode 12 and the anode 13 (i.e. the active area) such that the subgaskets 14 do not overlap the cathode 12 or the anode 13.

Meanwhile, the membrane electrode assembly 10 according to the present disclosure further includes a water discharge blocking region 11a formed in at least a portion of the peripheral region of the polymer electrolyte membrane 11, to which the subgaskets 14 are bonded.

The water discharge blocking region 11a is configured to prevent water in the polymer electrolyte membrane 11 from moving to the peripheral region of the polymer electrolyte membrane 11, which is outside the active area, due to diffusion thereof. That is, the water discharge blocking region 11a prevents water used for reaction in the fuel cell from diffusing to the peripheral region of the polymer electrolyte membrane 11 and being discharged out of the fuel cell, thereby preventing the water from being lost.

By the provision of the water discharge blocking region 11a, it is possible to prevent the movement and diffusion of water to the peripheral region of the polymer electrolyte membrane 11 and the discharge of the water to the outside, thereby preventing loss of the water. Consequently, it is possible to prevent a stack from being corroded by water discharged from each cell, thereby improving the corrosion resistance of the stack. In addition, it is possible to improve efficiency in handling of water in the fuel cell.

According to the present disclosure, the water discharge blocking region 11a is formed in the peripheral region of the polymer electrolyte membrane 11, to which the subgaskets 14 are bonded, by additional processing. After the processing, the peripheral region of the polymer electrolyte membrane 11 may perform a water discharge blocking function.

In addition, the water discharge blocking region 11a may extend along sides of the polymer electrolyte membrane 11 at the peripheral region of the polymer electrolyte membrane 11 so as to have a predetermined width. As illustrated in FIG. 1, the water discharge blocking region 11a may extend along the entire peripheral region of the polymer electrolyte membrane 11 so as to have a rectangular frame shape.

That is, as shown in FIG. 1, on the assumption that the peripheral region of the polymer electrolyte membrane 11, to which the subgaskets 14 are bonded, is formed in a rectangular frame shape, the water discharge blocking region 11a is formed in a portion of the peripheral region of the polymer electrolyte membrane 11 that is spaced apart from the active area by a predetermined distance so as to have a predetermined width.

Since the water discharge blocking region 11a is formed in the peripheral region of the polymer electrolyte membrane 11, to which the subgaskets 14 are bonded, the subgaskets 14 are stacked and bonded to the water discharge blocking region 11a of the polymer electrolyte membrane 11.

As shown in FIG. 1, the water discharge blocking region 11a is formed in the polymer electrolyte membrane 11 along four sides of the membrane electrode assembly 10, i.e. two long sides and two short sides thereof, so as to have a predetermined width at each side. The water discharge blocking region 11a is formed in a rectangular frame shape.

The width of the water discharge blocking region 11a of the polymer electrolyte membrane 11 may be 0.5 times or less the total width of the peripheral region of the polymer electrolyte membrane 11.

In short, the water discharge blocking region 11a of the polymer electrolyte membrane 11 is formed in a portion of the peripheral region of the polymer electrolyte membrane 11 excluding the active area (i.e. the electrochemical reaction area), in which the cathode 12 and the anode 13 are bonded to the polymer electrolyte membrane 11, i.e. the region in which the subgaskets are bonded to the polymer electrolyte membrane 11, spaced apart from the active area by a predetermined distance set at each side. At this time, the width of the water discharge blocking region 11a at an arbitrary position of each side may be 0.5 times or less the total width of the region in which the subgaskets are bonded to the polymer electrolyte membrane 11 at the same position.

If the width of the water discharge blocking region 11a is greater than 0.5 times the total width of the region in which the subgaskets are bonded to the polymer electrolyte membrane 11, the water discharge blocking region 11a, which is formed by metal cation substitution, as will be described below, is too close to the active area (i.e. the electrochemical reaction area), with the result that electrochemical reaction (i.e. fuel cell reaction) may be affected.

Unlike the embodiment of FIG. 1, the water discharge blocking region 11a may be formed in a portion of the peripheral region of the polymer electrolyte membrane 11, more specifically, only two opposite sides of the polymer electrolyte membrane 11, among the four sides of the polymer electrolyte membrane 11.

Figure 2:
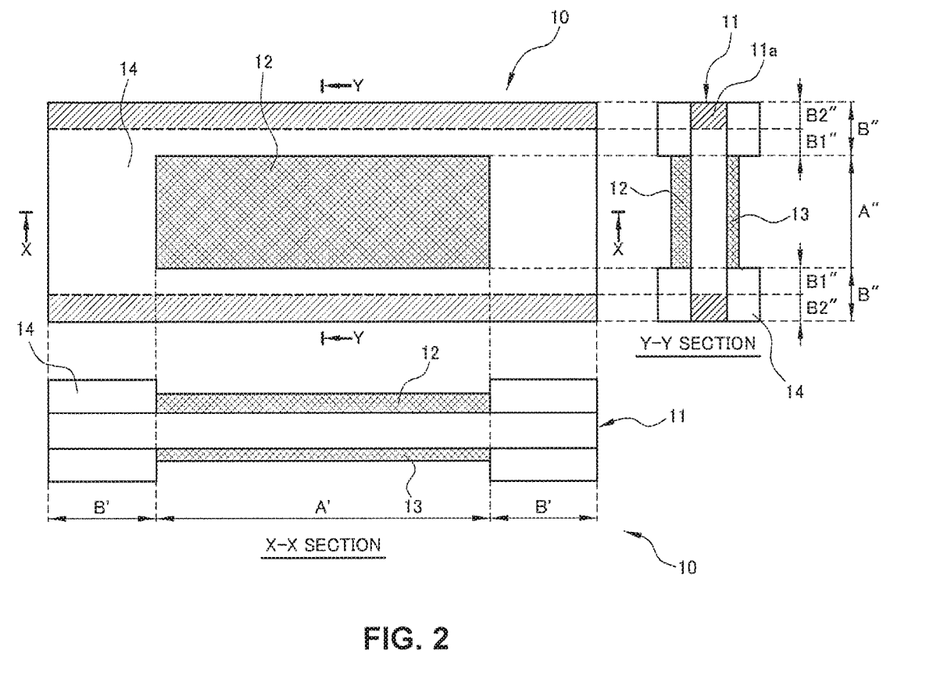
FIG. 2 shows a membrane electrode assembly according to another embodiment of the present disclosure.
Figure 3:
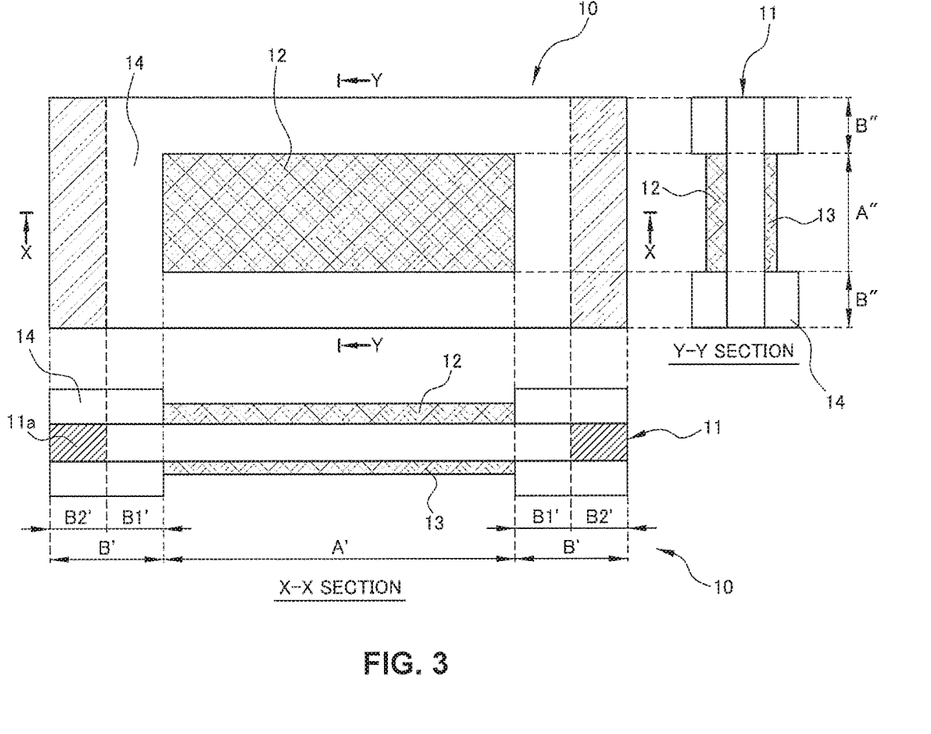
FIG. 3 shows a membrane electrode assembly according to a further embodiment of the present disclosure.

FIGS. 2 and 3 show embodiments in which the water discharge blocking region 11a is formed in only two opposing sides of the polymer electrolyte membrane 11. FIG. 2 shows an embodiment in which the water discharge blocking region 11a is formed in only two opposing long sides of the polymer electrolyte membrane 11, among the four sides of the polymer electrolyte membrane 11. FIG. 3 shows an embodiment in which the water discharge blocking region 11a is formed in only two opposing short sides of the polymer electrolyte membrane 11, among the four sides of the polymer electrolyte membrane 11.

In each embodiment, the water discharge blocking region 11a may be spaced apart from the active area by a predetermined distance at each side, as described above. Even in the embodiments of FIGS. 2 and 3, the width of the water discharge blocking region 11a at an arbitrary position of each side may be 0.5 times or less the total width of the region in which the subgaskets are bonded to the polymer electrolyte membrane 11 at the same position.

That is, in embodiments of FIGS. 1 to 3, the width of the water discharge blocking region 11a at an arbitrary position of each side may be less than the distance from the active area.

The reasons for this are that the water discharge blocking region 11a is spaced apart from the active area, in which the cathode 12 and the anode 13 are bonded to the polymer electrolyte membrane 11 and that the peripheral region of the polymer electrolyte membrane 11 (i.e. the region in which the subgaskets 14 are bonded to the polymer electrolyte membrane 11) outside the active area of the polymer electrolyte membrane 11 is divided into a portion forming the water discharge blocking region 11a and a portion forming only the polymer electrolyte membrane 11.

According to an embodiment of the present disclosure, the water discharge blocking region 11a may be formed by applying a solution containing metal cations to the polymer electrolyte membrane 11 such that protons coupled in a sulfonic acid group ($-SO_3^-H^+$) of the polymer electrolyte membrane 11 are substituted by the metal cations.

That is, in the present disclosure, the water discharge blocking region 11a for blocking the movement of water may be formed in the polymer electrolyte membrane 11. The property of a portion of the peripheral region of the polymer electrolyte membrane 11 corresponding to the water discharge blocking region 11a is changed by selective cation substitution such that a specific region in the polymer electrolyte membrane 11 forms the water discharge blocking region 11a.

The water discharge blocking region 11a is realized by changing the property of a portion of the region in which the subgaskets 14 are bonded to the polymer electrolyte membrane 11 by cation substitution. Consequently, the water discharge blocking region 11a blocks the movement of water in the polymer electrolyte membrane 11 to the outside, whereby it is possible to prevent the water from being discharged to the outside.

Prior research on the polymer electrolyte membrane shows that when metal cations, such as $Na^+$, $Ca^{2+}$, and $Fe^{3+}$, are exposed to the membrane, ion conductivity is reduced and membrane dehydration occurs (Kitiya Hongsirikam et al., J. Power Sources, 195, 7213-7220 (2010); Michael J. Kelly et al., J. Power Sources, 145, 249-252 (2005); D. A. Shores and G. A. Deluga, "Basic materials corrosion issues", Ch. 23 in Handbook of Fuel Cells—Fundamentals, Technology and Applications, Edited by Wolf Vielstich, Hubert A. Gasteiger, Arnold Lamm., Volume 3, John Wiley & Sons, Ltd. (2003)).

The reason for this is that protons coupled in a sulfonic acid group ($-SO_3^-H^+$) of the membrane are substituted by cations, which exhibit higher affinity for a sulfonic group ($-SO_3^-$) of the membrane than the protons, to disturb coupling between the protons and water molecules.

In particular, multivalent cations, rather than monovalent cations, are strongly affected.

If the above phenomenon occurs in the active area of the membrane electrode assembly, ion conductivity is reduced, whereby the performance of the fuel cell is greatly lowered.

However, in the case in which cation substitution is performed in the peripheral region of the polymer electrolyte membrane 11 outside the active area, i.e. the region in which the subgaskets 14 are bonded to the polymer electrolyte membrane 11, the water content of the membrane may be reduced without affecting the fuel cell reaction, thereby greatly reducing the amount of water discharged out of the membrane electrode assembly.

In the present disclosure, therefore, the polymer electrolyte membrane 11 includes a water discharge blocking region 11a formed in the peripheral region of the polymer electrolyte membrane 11 outside the active area by selective cation substitution.

The water discharge blocking region 11a in the polymer electrolyte membrane 11 is formed in at least a portion of the outer part of the region in which the subgaskets 14 are bonded to the polymer electrolyte membrane 11, excluding the active area, which is an electrochemical reaction part.

Hereinafter, a process of forming the water discharge blocking region in the polymer electrolyte membrane will be described.

First, as a method of forming the water discharge blocking region 11a in a selected region of the polymer electrolyte membrane 11, opposite surfaces of the polymer electrolyte membrane 11, excluding the water discharge blocking region 11a, are covered with a masking member (not shown), and a metal cation solution having a metal cation precursor dissolved in a solvent is applied to the exposed region of the polymer electrolyte membrane 11, which is not covered by the masking member, through a wet process, such as spraying, brushing, or rolling.

Alternatively, the water discharge blocking region may be simultaneously formed in the peripheral region of the polymer electrolyte membrane outside the active area of the cell by spraying a metal cation solution to the side surfaces of a fuel cell stack after assembling the fuel cell stack. However, the present disclosure is not limited thereto.

In the present disclosure, the metal (M) cation solution may include a metal cation precursor represented by [Chemical Formula 1] below and a solvent.

$$M(X)n \quad \text{[Chemical Formula 1]}$$

Where M may be selected from a group consisting of Na, Li, K, Ca, Mg, Cu, Zn, Ni, Fe, Cr, and Al, and X may be selected from a group consisting of chloride, sulfate, acetate, nitrate, hydroxide, and a combination thereof.

In addition, n is set based on the valence of M.

In the present disclosure, the metal cation solution may include one or more metal cation precursors. The metal cations, generated from the metal (M), may be bivalent metal cations. More specifically, the metal cations may be bivalent or trivalent metal cations.

In addition, the concentration of the metal cations in the solution may be at least 1 mol %. If the concentration of the metal cations is less than 1 mol %, cation substitution is not sufficiently performed, with the result that water discharge blocking efficiency may be reduced.

The solvent is used to dissolve the metal cation precursor. One or a mixture of two or more selected from a group consisting of de-ionized water, methanol, ethanol, iso-propyl alcohol, 1-propanol, and 2-methoxyethanol may be used as the solvent. De-ionized water may be used.

After the metal cation solution is applied to a selected region of the polymer electrolyte membrane 11 to form the water discharge blocking region 11a, as described above, the polymer electrolyte membrane 11 is dried and the masking member is removed for a time sufficient to perform cation substitution.

The polymer electrolyte membrane 11 may be dried using a natural drying method. Alternatively, a hot air drying method or a vacuum drying method may be used in order to reduce drying time.

After the masking member is removed to obtain the polymer electrolyte membrane 11, the cathode 12 and the anode 13 are stacked on the polymer electrolyte membrane 11, and the subgaskets 14 are stacked and bonded to the polymer electrolyte membrane 11 using an ordinary process.

After the cathode 12 and the anode 13 are formed, the water discharge blocking region 11a may be formed.

As a result, the water discharge blocking region, which is formed by metal cation substitution, is formed in the peripheral region of the polymer electrolyte membrane, which is outside the active area of the membrane electrode assembly, whereby it is possible to achieve an excellent handling property owing to the subgaskets, which is required of the membrane electrode assembly, to maintain the airtightness of the fuel cell, and to prevent the diffusion of water to the peripheral region of the fuel cell through the use of the water discharge blocking region.

Consequently, it is possible to improve efficiency in handling of water in the fuel cell, to improve corrosion resistance of the stack, and to improve safety in travel of a vehicle.

In FIGS. 1 to 3, A' and A" indicate the electrochemical reaction part, i.e. the active area of the membrane electrode assembly, in which the cathode 12 and the anode 13 are bonded to the polymer electrolyte membrane 11, and B' and B" indicate the region in which the subgaskets 14 are bonded to the polymer electrolyte membrane 11, i.e. the peripheral region of the polymer electrolyte membrane 11, which is outside the active area.

More specifically, A' indicates the length of the active area, and A" indicates the width of the active area.

In addition, B' indicates the width of the peripheral region at each short side, and B" indicates the width of the peripheral region at each long side.

In addition, B1' and B1" indicate a portion of the peripheral region of the polymer electrolyte membrane 11 in which cation substitution has not been performed, i.e. a cation un-substitution region, which is provided to separate the active area of the polymer electrolyte membrane 11 and the water discharge blocking region 11a from each other.

B1' indicates the width of the cation un-substitution region at each short side (i.e. the distance between the active area the water discharge blocking region), and B1" indicates the width of the cation un-substitution region at each long side (i.e. the distance between the active area the water discharge blocking region).

In addition, B2' and B2" indicate the water discharge blocking region 11a of the polymer electrolyte membrane 11, which is formed by selective cation substitution. In the embodiment of FIG. 1, the water discharge blocking region 11a is formed at four sides of the polymer electrolyte membrane 11. In the embodiment of FIG. 2, the water discharge blocking region 11a is formed at two opposing long sides of the polymer electrolyte membrane 11. In the embodiment of FIG. 3, the water discharge blocking region 11a is formed at two opposing short sides of the polymer electrolyte membrane 11.

As described above, B2'≤0.5×B' and B2"≤0.5×B" are shown in the embodiment of FIG. 1, and B2"≤0.5×B" is shown in the embodiment of FIG. 2.

In addition, B2'≤0.5×B' is described in the embodiment of FIG. 3.

As is apparent from the above description, in the membrane electrode assembly for fuel cells according to the present disclosure and the manufacturing method thereof, the water discharge blocking region, which is formed by metal cation substitution, is formed in the peripheral region of the polymer electrolyte membrane, which is outside the active area of the membrane electrode assembly, whereby it is possible to achieve an excellent handling property due to the subgaskets, which is required of the membrane electrode assembly, to maintain the airtightness of the fuel cell, and to prevent the diffusion of water to the peripheral region of the fuel cell through the use of the water discharge blocking region.

Consequently, it is possible to improve efficiency in handling of water in the fuel cell, to improve the corrosion resistance of the stack, and to improve safety in travel of a vehicle.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. A membrane electrode assembly for fuel cells comprising:
    an electrolyte membrane;
    a cathode and an anode, each being stacked on the electrolyte membrane; and
    subgaskets bonded to a peripheral region of the electrolyte membrane, which is outside an active area, in which each of the cathode and the anode are stacked on the electrolyte membrane,
    wherein the peripheral region of the electrolyte membrane is outside the active area and includes a first peripheral region and a second peripheral region, the second peripheral region being outside the first peripheral region and including a water discharge blocking region for preventing water in the electrolyte membrane from diffusing and being discharged to outside, and
    wherein the water discharge blocking region is formed by metal cation substitution.

2. The membrane electrode assembly of claim 1, wherein the water discharge blocking region is formed in a portion of the peripheral region of the electrolyte membrane that is spaced apart from the active area.

3. The membrane electrode assembly of claim 1, wherein the water discharge blocking region extends along sides of the electrolyte membrane at the peripheral region of the electrolyte membrane to have a predetermined width.

4. The membrane electrode assembly of claim 1, wherein the subgaskets are stacked on the entire peripheral region of the electrolyte membrane excluding the active area, in which each of the cathode and the anode are stacked on the electrolyte membrane.

5. The membrane electrode assembly of claim 1, wherein the water discharge blocking region is formed in the peripheral region of the electrolyte membrane along four sides of the electrolyte membrane.

6. The membrane electrode assembly of claim 1, wherein the water discharge blocking region is formed in the peripheral region of the electrolyte membrane along two opposite sides of the electrolyte membrane, among four sides of the electrolyte membrane.

7. The membrane electrode assembly of claim 1, wherein the water discharge blocking region is formed in a portion of the peripheral region of the electrolyte membrane, which is spaced apart from the active area along sides of the electrolyte membrane, and has a predetermined width, and
    wherein a width of the water discharge blocking region is 0.5 times or less a total width of the peripheral region of the electrolyte membrane.

8. The membrane electrode assembly of claim 1, wherein the water discharge blocking region is formed as a result of protons coupled in a sulfonic acid group ($-SO_3^-H^+$) of the electrolyte membrane being substituted by metal cations.

9. The membrane electrode assembly of claim 8, wherein the metal cations are selected from the group consisting of Na, Li, K, Ca, Mg, Cu, Zn, Ni, Fe, Cr, and Ai.

10. The membrane electrode assembly of claim 8, wherein the metal cations are bivalent or trivalent metal cations.

11. The membrane electrode assembly of claim 1, wherein the water discharge blocking region is disposed on the peripheral region of the electrolyte membrane in a lateral direction perpendicular to a stacking direction of the anode and the cathode on the electrolyte membrane.

* * * * *